(12) United States Patent
Ferrand

(10) Patent No.: US 9,097,803 B2
(45) Date of Patent: Aug. 4, 2015

(54) METHOD FOR SIMULTANEOUSLY LOCATING AND MAPPING VIA RESILIENT NON-LINEAR FILTERING

(75) Inventor: Julien Ferrand, Plouzane (FR)

(73) Assignee: THALES, Neuilly-sur-Seine (FR)

( * ) Notice: Subject to any disclaimer, the term of this patent is extended or adjusted under 35 U.S.C. 154(b) by 526 days.

(21) Appl. No.: 13/502,113

(22) PCT Filed: Oct. 25, 2010

(86) PCT No.: PCT/EP2010/066075
§ 371 (c)(1),
(2), (4) Date: Apr. 13, 2012

(87) PCT Pub. No.: WO2011/048224
PCT Pub. Date: Apr. 28, 2011

(65) Prior Publication Data
US 2012/0201099 A1    Aug. 9, 2012

(30) Foreign Application Priority Data

Oct. 23, 2009    (FR) ...................................... 09 05114

(51) Int. Cl.
*G01S 15/89* (2006.01)
(52) U.S. Cl.
CPC .................. *G01S 15/8902* (2013.01)
(58) Field of Classification Search
USPC .......................................................... 367/88
See application file for complete search history.

(56) References Cited

U.S. PATENT DOCUMENTS

| 6,088,519 A * | 7/2000 | Koford ........................ 716/123 |
| 2003/0198213 A1 * | 10/2003 | Jensen et al. .................. 370/351 |

(Continued)

FOREIGN PATENT DOCUMENTS

| WO | 03/065073 A1 | 8/2003 |
| WO | 2008/152618 A1 | 12/2008 |

OTHER PUBLICATIONS

Reed S et al.: "Automated approach to classification of mine-like objects in sidescan sonar using highlight and shadow information," IEEE Proceedings: Radar, Sonar & Navigation, Institution of Electrical Engineers, GB, LNKD, vol. 151, No. 1, Feb. 14, 2004, pp. 48-56.

(Continued)

*Primary Examiner* — James Hulka
(74) *Attorney, Agent, or Firm* — Baker & Hostetler LLP

(57) ABSTRACT

A method including carrying out, by means of an underwater vehicle moving above a given zone of the sea bed, observations on the basis of which the positions of elements of relief and of objects present on the bed are estimated. These observations are associated with fictitious objects, tied together by fictitious elastic links so as to constitute a fictitious elastic network. The network is in equilibrium as long as no action is exerted on one or the other of the fictitious objects constituting the network. The objects then occupy fixed positions, positions assigned to the corresponding observations. On the other hand, when two observations assumed to correspond to one and the same object are fused into a single observation, the two corresponding fictitious objects are brought closer together. This bringing closer together induces the appearance of stresses in the fictitious elastic network. These stresses, transmitted by the fictitious elastic links, are resolved by the modification of the positions of the fictitious objects of the network, the modified positions being assigned to the corresponding observations. In this way, when the estimated position of an object having formed the subject of two fused observations is corrected, the measurement of the estimated position of each of the objects that has given rise to an observation represented in the fictitious elastic network benefits advantageously from this correction.

9 Claims, 5 Drawing Sheets

(56) References Cited

U.S. PATENT DOCUMENTS

| | | | |
|---|---|---|---|
| 2008/0147328 A1* | 6/2008 | Wang et al. | 702/16 |
| 2008/0219094 A1* | 9/2008 | Barakat | 367/21 |
| 2009/0179790 A1* | 7/2009 | Jahangir | 342/25 B |
| 2010/0074054 A1* | 3/2010 | Barakat et al. | 367/76 |
| 2010/0198897 A1* | 8/2010 | Yarman | 708/270 |
| 2010/0226204 A1* | 9/2010 | Gagliardi et al. | 367/16 |
| 2013/0250721 A1* | 9/2013 | Robertsson | 367/24 |

OTHER PUBLICATIONS

Groen J et al.: "Shadow Enhancement in Synthetic Aperture Sonar Using Fixed Focusing," IEEE Journal of Oceanic Engineering, IEEE Service Center, Piscataway, NJ, US, LNKD, vol. 34, No. 3, Jul. 1, 2009.

* cited by examiner

METHOD FOR SIMULTANEOUSLY LOCATING AND MAPPING VIA RESILIENT NON-LINEAR FILTERING

CROSS-REFERENCE TO RELATED APPLICATIONS

This application is a National Stage of International patent application PCT/EP2010/066075, filed on Oct. 25, 2010, which claims priority to foreign French patent application No. FR 09 05114, filed on Oct. 23, 2009, the disclosures of each of which are incorporated by reference in their entireties.

FIELD OF THE DISCLOSED SUBJECT MATTER

The invention is concerned with the detection and location of objects and the mapping of zones, by means of a detection device. It is more particularly concerned with the domain of detection sonars and the mapping of seabeds.

BACKGROUND

Carrying out the mapping of a zone of terrain consists mainly in pinpointing the geographical position of the prominent elements located over the zone considered, relief elements or fixed objects in particular. This mapping is generally carried out by means of detection systems mounted on an appropriate vehicle, the vehicle traversing the ground of the zone considered, or overflying this zone, as the case may be. In practice, the detection system determines the relative position of the prominent elements with respect to the vehicle and the absolute position of each element is determined by associating the measured relative position and the position, assumed known, of the vehicle at the instant of detection and which is for example determined by the navigation system of the vehicle.

Thus for example the mapping of an emerged zone of terrain may be carried out using a radar system having sufficient resolution, this radar being mounted on an aircraft, a remotely controlled aircraft or else an automatic system of Drone type. Hence the aircraft is deployed above the zone considered and performs the determination of the position of each prominent element by means of the measurements performed by the radar, which give the relative position of the element considered with respect to the aircraft and information about the geographical position of the aircraft, a position generally determined with the aid of a system of GPS receiver type located aboard the aircraft. Hence the position of the aircraft being known with precision, the position of the element considered may be determined with great precision, as long as the measurements provided by the radar have the desired precision.

However, there exist circumstances where the determination of the position of the prominent elements cannot be carried out in this way with sufficient precision.

Such is notably the case if the determination of the relative position of the prominent elements with respect to the vehicle tasked with carrying out the mapping is not carried out with the desired precision; because the measurements carried out by the detection system do not have the desired precision for example.

Such is also the case if the geographical position of the vehicle is known with insufficient precision. Such is for example the case if the vehicle is an aircraft which does not have any GPS system. Such is also the case if, for example, the zone to be mapped is a submerged, underwater zone. The mapping is then carried out with the aid of a sonar system carried by an autonomous or non-autonomous underwater vehicle, which cannot possibly determine its position with the aid of the GPS system, GPS information being, in a known manner, inaccessible to a vehicle being deployed under water.

In these last two cases, the determination of the position of the vehicle at each instant of its displacement is carried out by implementing conventional means, inertial means for example, which, commencing from a starting position, assumed to be known with precision, determine the relative displacement of the vehicle with respect to this origin.

This so-called dead reckoning navigation technique makes it possible to estimate the position of the vehicle at any instant. The measurements carried out with the aid of such means are then generally less precise. Moreover a drift is noted in the course of time of the determination of the absolute position of the vehicle with respect to its real position. Ultimately the absolute position of the prominent elements is estimated with lesser precision, a precision which is sometimes even insufficient.

As regards the mapping of an underwater zone, the latter is generally carried out by means of an underwater vehicle, an underwater drone for example, equipped with a lateral sonar and being deployed above the zone to be mapped, in proximity to the bed. The position measurements are generally carried out by grazing insonification of the seabed.

This type of insonification advantageously makes it possible to chart a prominent object not by the echo that it reflects but by the "acoustic" shadow that it casts on the bed. Detection based on acoustic shadow is particularly advantageous for charting certain objects, certain stealthy underwater mines in particular, which hardly reflect, if at all, the sound wave emitted by the sonar but which nonetheless act as a screen and therefore produce an acoustic shadow. It is recalled here that the acoustic shadow cast by an object can be defined here by the bed zone for which the object considered constitutes a screen preventing its insonification.

Hence by implementing any known appropriate processing, it is possible to determine the contours of the acoustic shadow cast by a prominent object, which contours make it possible to determine the position and the profile of the object itself and to carry out a classification of the located objects, in an easier manner than on the basis of the echoes reflected by the objects themselves, notably if this classification is carried out in an automatic manner.

However the determination of the exact position of an object, on the basis of the acoustic shadow that it produces, is sometimes difficult and in any event approximate. It depends in particular on the angle of insonification and the direction in which the object is insonified. Hence, even if the absolute position of the vehicle is known at any instant with precision, the relative position of the object with respect to the vehicle, and consequently its absolute position, can only be determined, estimated, with a bias due to the shift between the position of the acoustic shadow and that of the real object.

Furthermore, the zone to be mapped being insonified from various directions, on account of the displacements of the vehicle above this zone, it sometimes happens that one and the same prominent object is insonified several times in different directions. It then produces distinct acoustic shadows which give rise to the determination, for one and the same object, of several detections having different estimated positions, and which leads to several observations being identified for a single real object.

Hence it is then necessary to refine the mapping carried out by implementing appropriate means for associating the observations so as to determine whether two localized characteristic elements do or do not constitute one and the same element considered from different angles.

In the zones of low or mean density, the known solutions successfully carry out the pairing of the observations relating to one and the same object. Hence, the position of an object having formed the subject of multiple locations, these locations having been recognized as relating to this same object, can then be re-estimated with greater precision by techniques for calculating weighted averages.

On the other hand, no particular benefit is derived from this readjustment operation as regards the other prominent objects which have formed the subject of only a single detection. The resulting mapping therefore makes it possible only to fuse the observations representing one and the same object, and thus to improve the precision of the estimation of the position of this object. It does not make it possible to improve the global precision of the location of the other objects detected in the mapped zone.

Moreover, these known solutions are not concerned with the problem posed by the positioning errors pursuant to the vehicle's absolute positioning error, which error is due mainly to the precision and to the drift of the navigation system which estimates the absolute position of the vehicle.

SUMMARY

An aim of the invention is notably to propose a means making it possible to improve the precision of the mapping of an underwater zone, in particular when the latter is carried out on the basis of an underwater vehicle moving over the zone considered and insonifying the zone by means of a lateral sonar and when the detection and the determination of the position of the prominent objects of the zone are carried out by detecting the acoustic shadows or the echoes produced by the latter.

Another aim of the invention is to limit the influence of the navigation system position errors, on the measurement of the position of the observed objects and on the determination of the absolute position of the vehicle.

For this purpose the subject of the invention is a method for estimation and dynamic correction of the absolute position of objects observed on the seabed by a sonar detection system carried by a vehicle being deployed above the bed, an object being detected by the observation of its acoustic shadow, this observation giving rise to the creation of a fictitious object, or contact, whose estimated position is initially that associated with the observation which gave rise to it and which represents the detected object. The method according to the invention comprises two phases.

A first phase consists in constructing a fictitious mesh on the basis of the observations performed in the course of time, the mesh being constructed by representing each observation performed by a node whose position is that of the observation and by connecting the nodes together by way of fictitious elastic links. Each new observation is associated with a node which is connected to a fictitious anchoring point, situated on the seabed, by a first fictitious elastic link. This node is integrated into the existing mesh by way of a set of fictitious elastic links, each of these links connecting the node to existing nodes of the mesh which correspond to observations preceding the observation considered in time. A node associated with a new observation is moreover tied by another fictitious elastic link to the node associated with the contact corresponding to this new observation, a node whose position is that of the observation site. The elastic links thus established have initial lengths such that having regard to the positions of the various nodes they do not exert any tension on the nodes to which they are connected.

A second phase consists, when two observations are considered to relate to one and the same object, in fusing these observations by associating them with a single contact, whose position is dependent on the two fused observations. The fusion is manifested at the level of the mesh by replacing the nodes associated with the contacts corresponding initially to the observations by a single node associated with the new contact formed. This node is tied to the nodes associated with the corresponding observations by way of the fictitious links initially connecting the node associated with each observation to the node associated with its contact. The introduction of this common node into the mesh induces on the nodes associated with the fused observations tensions which are transmitted to the other nodes of the mesh by the diverse fictitious elastic links and which are resolved by a modification of the positions of the nodes constituting the mesh. The modified position of each node is assigned to the observation or to the contact associated with the node considered.

According to the invention, the first phase is implemented throughout the duration of the seabed analysis operation, while the second phase is implemented each time that the fusion of two observations is decided.

According to a form of implementation of the method according to the invention, when particular observation is considered to correspond to an object whose real position is known, a variant of the second step is carried out consisting in modifying the position of the node associated with the contact corresponding to this observation in such a way that it definitively occupies the position of this object; the association of an observation and of a known object having the same effects on the mesh and therefore, on the positions of the other observations and contacts, as the fusing of two observations.

According to a particular form of implementation, the method according to the invention comprises a complementary phase, carried out after the second phase, consisting in recalculating the estimated position of the vehicle on the basis of the updated estimations of the positions of the observations.

According to a form of implementation of the method according to the invention, the fictitious elastic link tying a node i corresponding to a new observation to its ground inking point is a link of zero initial length, whose stiffness $k_A$ is defined by the relation:

$$K_A(i) = \frac{1}{\sigma_i^2}$$

$\sigma_i$ corresponding to the uncertainty in the measurement of the position of the observation i.

According to a form of implementation of the method according to the invention, the fictitious elastic link tying a node i corresponding to a new observation to the node of the mesh corresponding to an earlier observation j is a link whose length is determined by the positions of the nodes at the moment of the establishment of the link in such a way that the node corresponding to the new observation is positioned vertically in line with its anchoring point (42) and that the link does not exert any stress on the nodes considered, and whose stiffness $k_L$ is defined by the relations:

$$K_L(i,j) = \frac{1}{\sigma_{ij}^2} \text{ and } \sigma_{ij} = \sqrt{\sigma_i^2 + \sigma_j^2}$$

$\sigma_i$ and $\sigma_j$ corresponding respectively to the uncertainties in the measurements of the positions of the observations i and j.

According to a form of implementation of the method according to the invention, the fictitious elastic link tying a node i corresponding to a new observation to the node corresponding to its contact is a link of zero initial length, whose stiffness $k_C$ is defined by the relation:

$$K_C(i,k) = \frac{1}{\sigma_i^2}$$

$\sigma_i$ corresponding to the uncertainty in the measurement of the position of the observation i.

According to a form of implementation of the method according to the invention, the propagation of the stresses imposed by fusions of observations being manifested by a modification of the positions of the various nodes constituting the mesh, a vector PI of the initial positions of the various nodes is defined, whose size varies in the course of time as new observations are performed and whose components form a list of N components, the first $N_{obs}$ components relating to the nodes associated with observations and the last $N-N_{obs}$ components relating to the nodes associated with contacts, each component corresponding to the position occupied by a node upon its introduction into the mesh, and a vector PC of the corrected positions of the various nodes constituting the mesh at a given instant whose size varies in the course of time as new observations are performed and as fusions take place, the vector PC being defined on the basis of the vector PI by the following relation:

$$PC = PI + Q_{opt}$$

In which $Q_{opt}$ represents the vector of the optimal nodal displacements each of whose components corresponds to the correction term to be applied to the corresponding component of the vector of the initial positions PI so as to determine the corresponding component of the vector of the corrected positions; each component of the vector $Q_{opt}$ being dependent on the configuration of the global mesh at the instant considered and the characteristics of the fictitious elastic links connecting the nodes together.

According to this form of implementation of the method according to the invention, the vector of the optimal nodal displacements $Q_{opt}$ may be defined by the following relation:

$$Q_{opt} = -[M+C]^{-1} \cdot C \cdot PI,$$

in which M and C represent two square matrices whose dimensions are equal to the number of nodes of the mesh at the instant considered, these matrices being previously initialized to zero;

the establishment of the matrix M being carried out gradually in two phases:
  a first phase during which the values of the elements (i, i) situated on the diagonal of the matrix, an element of the diagonal characterizing the link of each node associated with an observation i to its anchorage, are calculated on the basis of the following relation:

$$M(i,i) = M(I,I) + k_A(i)$$

with $K_A(i) = 1/\sigma_i^2$
  a second phase during which the value of each element (i, j) of the matrix, characterizing a link existing between the nodes of an observation i and of an observation j, is calculated on the basis of the following relations:

$$M(i,i) = M(i,i) + k_L(i,j),$$

$$M(j,j) = M(j,j) + k_L(i,j)$$

and $$M(i,j) = M(i,j) - k_L(i,j)$$

$$M(j,i) = M(j,i) - k_L(i,j)$$

with $K_L(i,j) = 1/\sigma_{ij}^2$ and $\sigma_{ij} = \sqrt{\sigma_i^2 + \sigma_j^2}$
the establishment of the matrix C being carried out gradually in two phases:
  a first phase during which the value of each element (i, k) of the matrix, characterizing a link existing between the node associated with an observation i and that associated with a contact k, is calculated on the basis of the following relations:

$$C(i,i) = C(i,i) + k_C(i,k)$$

$$C(N_{obs}+k, N_{obs}+k) = C(N_{obs}+k, N_{obs}+k) + k_C(i,k)$$

$$C(i, N_{obs}+k) = C(i, N_{obs}+k) - k_C(i,k)$$

$$C(N_{obs}+k, i) = C(N_{obs}+k, i) - k_C(i,k)$$

with $K_C(i,k) = 1/\sigma_i^2$
Where $N_{obs}$ represents the number of observations carried out.

The subject of the invention is incidentally a method of non-real-time mapping of a seabed zone this mapping being carried out on the basis of the positions of objects observed by a sonar detection system during an operation of observing the seabed zone considered during which the sonar measures the position of the detected objects, characterized in that it implements the method as claimed in any one of claims 1 to 3 on the stored observations, the positions of the observations thus recalculated being used to fill in the map of the zone considered.

Advantageously the method according to the invention makes it possible to exploit the improvement of the estimation of the position of certain objects observed several times by fusions of the observations, considered to relate to one and the same object, so as to automatically improve the position estimation for the set of objects observed. Still advantageously, it makes it possible to improve the estimation of the absolute position of the vehicle that performs these observations by readjustment effect.

BRIEF DESCRIPTION OF THE DRAWINGS

The characteristics and advantages of the invention will be better appreciated by virtue of the description which follows, which description sets forth the invention through a particular embodiment taken as nonlimiting example and which is supported by the appended figures, which figures represent.

DETAILED DESCRIPTION

In the subsequent description, the method according to the invention is described in its application to an underwater mapping operation with the aid of a sonar system carried by an underwater vehicle in motion above the zone of the seabed that it is desired to map. This particular application is, of course, not limiting of the field and scope of the invention. Any application of the method according to the invention to a context of mapping or pinpointing of positions naturally enters the field of protection of the patent.

Figure 1:
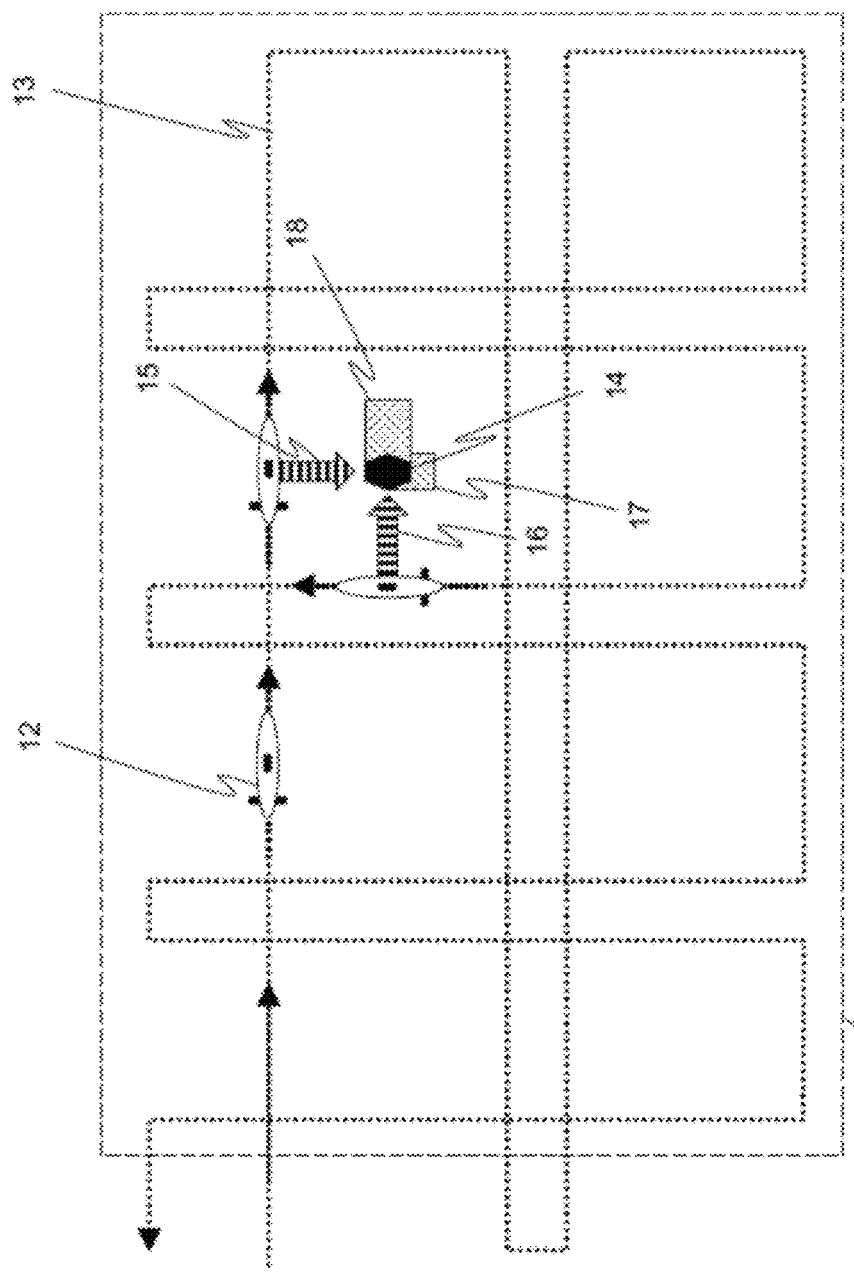
FIG. 1, the schematic illustration of an operation of mapping a zone of the seabed by a vehicle equipped with a detection system using a lateral sonar.

FIG. 1 presents a schematic illustration of the scenario of a mapping mission carried out by a vehicle. The object of such a mission is generally to chart and to locate as precisely as possible diverse objects lying on the seabed. The objects of interest are here generally stationary objects which may equally well consist of wrecks, relief elements (boulders) or else manufactured objects lying on the bed or partially buried. To locate the objects present in a zone 11 to be observed, use is generally made of an underwater vehicle 12 equipped with detection means, a lateral sonar for example, that is made to move above the zone 11 along a transit 13. The shape and the duration of the transit is mainly dependent on the configuration and the range of the detection means. According to the nature of the mission performed, the transit 13 may moreover be performed once or repeated as many times as allowed by the duration of the mission. Furthermore one and the same mission can envisage the stringing together of several different transits 13 making it possible to carry out observations of the seabed from different perspectives. Thus one and the same object 14 present in the mapped zone may be observed from various angles in the course of one and the same transit or in the course of the successive transits performed by the underwater vehicle carrying the detection system.

Figure 2:
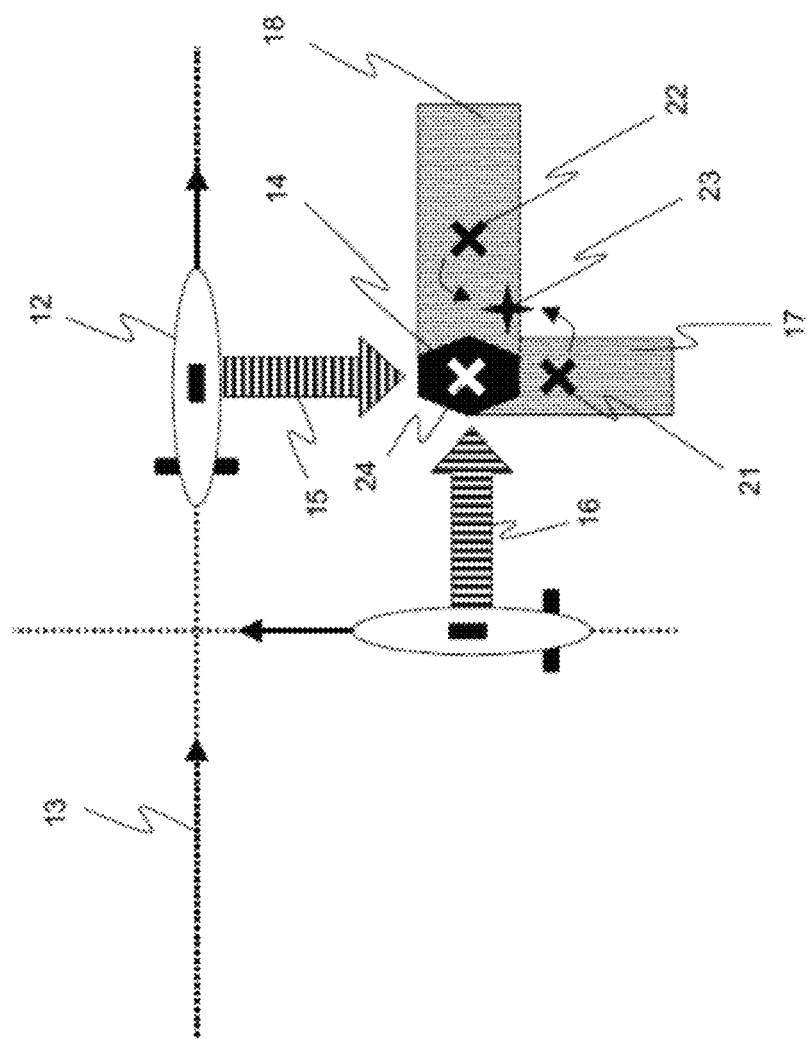
FIG. 2, an illustration presenting a magnified detail of the illustration of FIG. 1, FIG. 3, a basic flowchart of the method according to the invention.

As stated previously the mapping of an underwater zone is generally carried out on the basis of the observations of the acoustic shadows of the objects 14 detected on the bed. Now, the observation and the analysis of the shadow 17, 18 cast by an object makes it possible to perform only a simple estimation of the real position of the object, which estimation is all the more uncertain the more extensive the cast shadow. This is why it is advantageous that each object present in the zone 11 form the subject of several observations, symbolized by the arrows 15 and 16, from preferably different angles. In this way, as illustrated by the detailed illustration of FIG. 2, the joint utilization of the various estimations carried out separately on the basis of each of the observations 15, 16 and symbolized by the crosses 21 and 22 in the figure, makes it possible to carry out an estimation of the position of a common contact associated with the two observations 15 and 16, and symbolized by the star 23, the position of this contact being closer to the real position of the object, which position is symbolized by the cross 24. It is recalled here that according to the invention in contradistinction to an observation which is actually real, a contact is a fictitious object characterized by a position and an uncertainty in this position, the position of the contact at a given instant is presumed to represent an estimation for this instant of the position of an object for which observations have been carried out. In this respect, according to the invention an observation is always associated with a contact, a contact possibly being for its part associated with several observations. Hence when a contact is associated with a single observation, its position is that of the observation in question.

Figure 3:
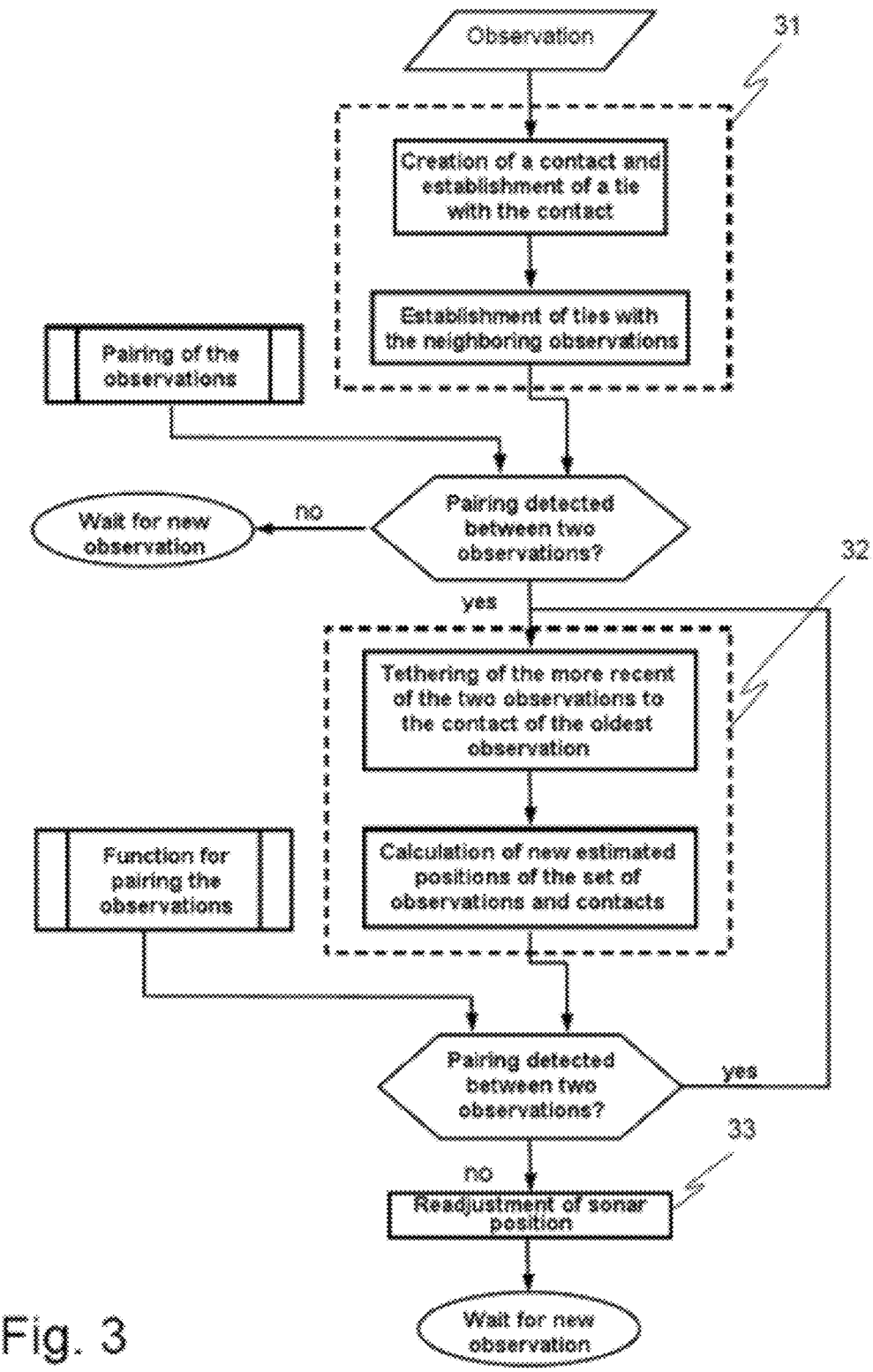

FIG. 3 presents a basic flowchart of the method according to the invention. The object of this method is to carry out two main functions:

The first function consists in formulating in a continuous manner, as the observations are carried out, a fictitious elastic mesh consisting of nodes connected together by a network of fictitious elastic ties. Each node represents, for the mesh, an observation relating to a detected object, an observation whose position represents an estimation of the position of the object from which this observation originates. The construction of this fictitious mesh is carried out by the successive tetherings to the already existing mesh of nodes corresponding to the appearance in the course of time of new observations. According to the invention, a new node is hitched to the existing mesh by way of fictitious elastic ties these ties connecting the new node to the nodes most recently hitched to the mesh. These fictitious elastic ties have nominal lengths such that the tethering of a new node, representing a new observation, does not impose any constraint in terms of position at the nodes of the existing mesh. Each addition of an observation is manifested moreover by the addition of a further fictitious node corresponding to the contact and of an elastic link between the node representing the observation and that representing the contact.

The second function consists, when two given observations may be associated with one and the same object, in manifesting this association by the fusing of the associated contacts and by associating the two observations with one and the same contact. This fusion is manifested by the tethering of each of the two nodes to the node corresponding to the single contact. Hence the tethering being carried out by means of the elastic links initially connecting the node corresponding to each observation to the node corresponding to its contact, its effect is to cause the nodes corresponding to the two observations concerned to come closer together and, by a phenomenon of stress propagation, a modification of the positions of the nodes of the elastic network as a whole, in causing a modification of the positions of the other nodes of the mesh. Thus, the position of the nodes of the mesh being modified, it is possible to assign to each observation associated with a node of the mesh, a corrected position corresponding to the position taken by the corresponding node.

Thus, the coming closer together of the nodes corresponding to the fusing of two observations makes it possible to associate with the object from which the two observations originate, a single contact whose estimated position takes account of the two observations. This estimated position is more precise and more exact than was the position estimated on the basis of one or the other of the observations. It also makes it possible by virtue of the propagation of the stress imposed by the elastic links, to apply a correction to the position of each node of the mesh. Hence, the positions of the observations associated with these nodes of the fictitious elastic mesh, a position which itself represents an estimation of the position of the object that gave rise to this observation, are modified and benefit from the increase in precision assisting the determination of the positions of the fused observations. The estimation of the position of the corresponding object is thus advantageously utilized.

Figure 4:
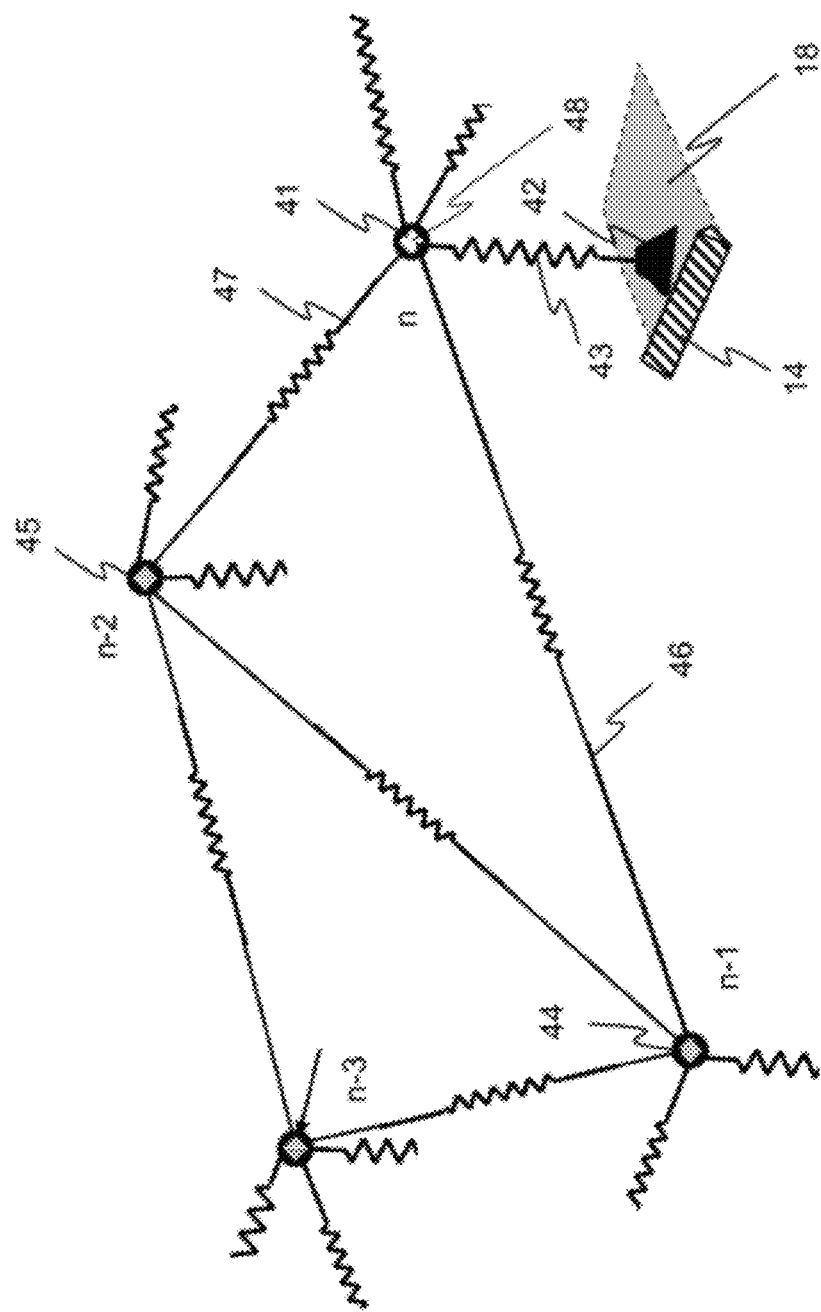
FIG. 4, an illustration of the principle of constructing the fictitious network of elastic links according to the invention.
Figure 6:
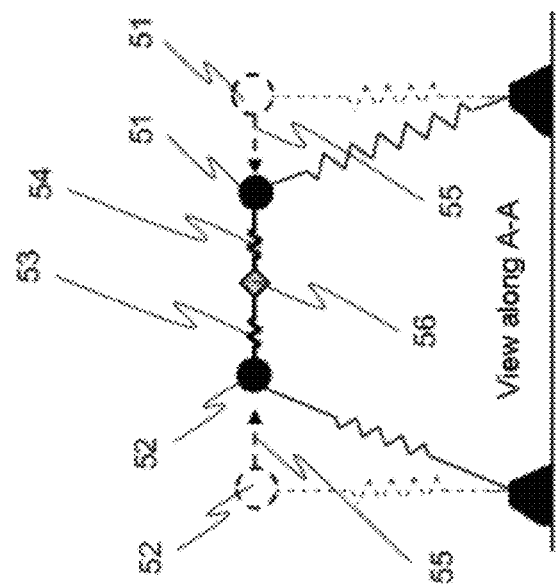
FIGS. 5 and 6, illustrations relating to the operating principle of the method according to the invention.
Figure 5:
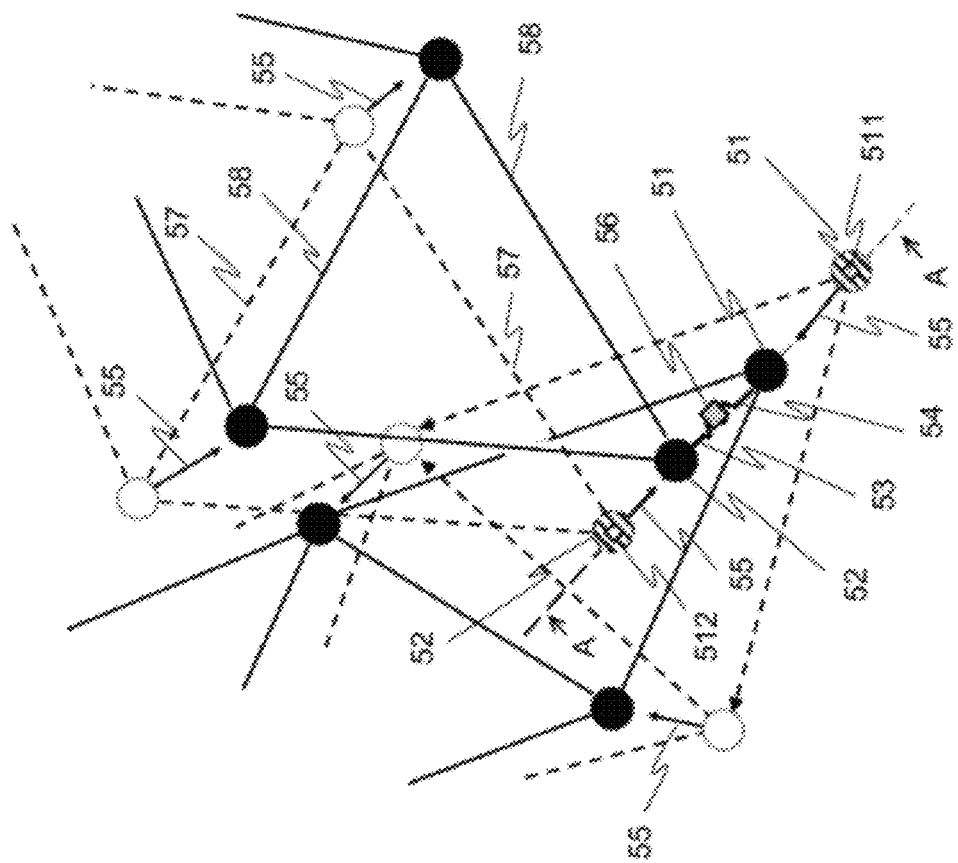

For this purpose the method according to the invention comprises two main steps 31 and 32, as illustrated by FIG. 3. FIG. 4 more particularly illustrates the functioning of the first step 31, while FIGS. 5 and 6 illustrate the functioning of the second step 32. FIG. 5 presents a schematic view, from above, making it possible to understand the consequences engendered by the fusing of two observations. FIG. 6 presents a partial view of the same situation in a plane A-A.

The first step 31 consists, for each new object observation carried out, in ensuring the tethering of a node corresponding to said observation to the network of existing fictitious elastic ties. As illustrated by FIG. 4, the tethering of a node 41 to the already constructed mesh is carried out by means of fictitious elastic ties, 46, 47, of given stiffnesses whose lengths are such that installing them does not cause the appearance of any tension in the already existing network, the fictitious elastic network being in an equilibrium position. The addition of an observation is also manifested by the addition of a fictitious ground anchorage 42 and of a fictitious link 43 between this anchorage and the node 41 corresponding to the observation. Finally the addition of an observation is also manifested by the addition of a further fictitious node 48 corresponding to the contact associated with the observation and of a fictitious link, not visible in FIG. 4, between the node 41 representing the observation and the node 48 representing the contact.

The second step 32 consists for its part, when two observations are judged as possibly relating to one and the same object, in carrying out the fusion, into a single node 56, of the nodes 511 and 512 corresponding to the contacts associated with these observations and in carrying out the tethering of the node 56 resulting from the fusion to the nodes corresponding to these observations. As illustrated by FIG. 5, the tethering of the nodes 51 and 52 corresponding to each of the observations to the node 56 corresponding to the contact resulting from the fusion of the contacts, is carried out by means of the fictitious ties 53 and 54, initially connecting these node 51 and 52 to the nodes 511 and 521 associated with the initial contacts. This then causes the nodes 51 and 52 of the two observations to come closer together, this being manifested by the appearance of tensions which propagate within the elastic mesh. The resolution of these tensions leads to a new equilibrium which is manifested by a global modification of the positions of the nodes of the mesh corresponding to the other observations. The perturbation created thus leads to the installing of a new equilibrium state of the elastic mesh which is itself manifested by the displacement of certain nodes and the modification of their positions.

As stated previously, the observations performed by the vehicle are associated with fictitious nodes anchored on the seabed and connected together in tandem with their construction 47, 46. In practice as illustrated by FIG. 4, each new observation 41, that is to say each new node, is firstly anchored to the ground at a fictitious anchoring point 42 by way of a fictitious elastic link 43, of zero length and given stiffness $k_4$. This inking point occupies a fixed and invariant position. It is for example positioned on the ground, vertically in line with the estimated initial position of the new observation.

This new node 41 is also chained with a certain number of nodes of the mesh, two nodes for example, representing observations 44 and 45 which temporally precede the new observation. In the same manner the node corresponding to the previous observation 44 is chained with the nodes associated with the observations which precede it, which include the observation 45. In the example, the chaining is carried out by connecting the nodes 41 to the nodes 44 and 45 by the means of elastic links 46 and 47 of respective lengths $l_2$ and $l_3$ and of given stiffnesses $k_2$ and $K_3$.

According to the invention, the lengths of the links 46 and 47 between the node associated with the observation 41 and the nodes associated with the previous observations 44 and 45 are defined by the distances separating the initial positions of the observations 41, 44 and 45 such that the node 41 is positioned vertically in line with its anchoring point 42 and that the links 46 and 47 do not transmit any stress to the nodes 41, 44 and 45 tied together.

It should be noted that the length of the anchoring link 43 does not play any particular role here: the invention entails a horizontal plane, and is represented in three dimensions only to facilitate its representation.

It should also be noted that, in the context of the invention, the fusion of two observations is considered to be the result of a process of association, of pairing, of the observations performed which is conducted in parallel with the method according to the invention. This pairing process, the object of which is to consider separate observations and to determine whether they may or may not correspond to one and the same object, is not described here and may be undertaken by any otherwise known method. Hence, the method according to the invention is, as indicated by FIG. 3, assumed to be informed regularly of the fusion of two observations.

When such an item of information is transmitted, the method according to the invention performs, in the course of step 32, a fusion of the two contacts initially associated with the observations, into a single contact. The node 56 associated with this single contact is then tied to the nodes 51 and 52, associated with the two fused observations, by means of the fictitious elastic links 53 and 54, of stiffness $k_4$ and $k_5$ which initially (before fusion) connected each observation to its contact.

The consequence of the fusion is the modification of the positions of the nodes 51 and 52 which are ultimately located at two new positions. The displacement, demarcated by the arrows 55, of each of these two nodes corresponding to the fused observations is at one and the same time dependent on the parameters specific to each of the two observations and also on the reaction of the network of fictitious elastic links to which they are tied. The series of elastic stresses which propagate through the mesh thus leads, as the figure illustrates, to a global modification of the positions of the various nodes of the mesh, a modification symbolized by the arrows 55 in FIG. 5. In this way it is possible to assign to each of the observations corresponding to the various nodes constituting the mesh, a new position corresponding to readjustment of the observation, that is to say to a refined determination of the position of the object corresponding to this observation.

According to the invention, the modifications of the positions of the various nodes, subsequent to the installing of an additional link between the nodes associated with two fused observations, correspond to a return to equilibrium of the fictitious elastic mesh. This evolution of the mesh is demarcated in FIG. 5 by the switch from the mesh represented by dashed lines 57 (state before fusion) to the mesh represented by solid lines 58 (state after fusion).

On completion of step 32, a series of observations is therefore available whose positions have been automatically modified in accordance with the modifications of the positions of the nodes corresponding within the fictitious mesh. The installing of this fictitious elastic mesh advantageously has the concrete and real consequence of allowing each observation to benefit, in an automatic manner, from the consequences of the fusion of two other observations. Thus at each fusion, the position of each of the observations is modified in such a way that the increase in precision that is normally obtained in the estimation of the position of an object when it is possible to associate it with two observations, also benefits, to a lesser extent however, from the determination of the estimated position of the objects from which the other observations originate and on the basis of which the fictitious mesh is constructed. Hence the estimated position of each of the objects is thereby refined.

The subsequent description is concerned with the way in which the network of elastic links is established and with the rules which govern its evolution in the course of time and with the tempo of fusions of observations. This mesh is constructed in such a way that the modifications of the positions of the observations associated with the mesh occur in a sense which improves the precision of the estimation of the objects corresponding to these observations. Hence, the following notions are firstly formalized:

The observation of a given zone of the seabed is manifested by a temporal succession of observations $O_i$ which correspond to the detection of objects, by means of an automatic detection algorithm for example.

In practice, each observation Oi corresponds to a shadow present in the sonar image and is characterized by an initial position Pi, a corrected position Ci and a position uncertainty σi.

The position uncertainty $\sigma_i$ for the observation $O_i$ carried out is consequent on the uncertainty of detection $\delta_i$ of the system and on the uncertainty of positioning $\alpha_i$ of the underwater vehicle. The two uncertainties are considered to be independent so that it is possible to write:

$$\sigma_i = \sqrt{\delta_i^2 + \alpha_i^2} \quad [1]$$

A contact $T_j$ is moreover defined as an entity representing a real object lying on the bed. By nature a contact is defined only if it is associated with at least one observation which demarcates the fact that an object has been detected. Conversely, an observation is always associated with a contact. A contact is characterized by an estimated position $TE_j$ (resulting from a calculation) and an estimated uncertainty $\sigma T_j$. A contact does not have any initial position, on account of the mesh, automatically occupies the position of the observation with which it is associated. Furthermore apart from the cases where two observations fuse, the contact is akin, from a geographical point of view, to the observation with which it is associated. An observation is moreover tied to a contact by a fictitious link of zero length.

The fictitious network of elastic ties, or global mesh, establishes links between the observations, or more exactly between the nodes corresponding to the observations in the fictitious mesh, as was described qualitatively in the foregoing text. It is a linear mesh which fictitiously ties, gradually in the course of time, each observation to previous observations. A node is thus defined as a place in the mesh forming the end of an elastic link, or the point of connection of several links. The displacement of a node under the action of the stresses that may appear in the mesh constitutes a nodal displacement.

According to the invention, the fictitious elastic mesh is defined as being in equilibrium, at rest, devoid of any stress, as long as no observation fusion is taken into account. In particular, each fictitious elastic link, 43, 46 or 47 (links between nodes associated with observations or anchoring link), is of just sufficient length not to exert any stress on the mesh as long as no fusion of observations is carried out. During this phase the position associated with each node 41 is that of the anchoring point 42 whose position corresponds to the initial position $P_i$ of the observation.

According to the invention, the global mesh is on the other hand subjected to stresses which appear during the closing of loops, that is to say when the system identifies that an observation carried out is liable to be attached to an already detected object and associated with another observation. In such a circumstance the stretching of the ties 53 and 54 connecting the two nodes 51 and 52, stretching subsequent to the tethering of these nodes to the node associated with the single contact 56, engenders tensions which increase the potential energy of the global mesh, which energy may be defined as the sum of the potential energies of all the elastic links constituting the global mesh. According to the invention the global mesh is then altered in such a way that it preserves the lowest possible global potential energy. This alteration is manifested by a change of position for all or some of the nodes constituting the global mesh. Hence this alteration of the fictitious mesh may be transposed directly to the real world by associating with each observation the modified position of the node with which it is associated and which represents it in the fictitious mesh. In this way, in tandem with the fusions, the positions of the various observations may be refined without it being necessary to perform all the observations several times, nor even it being necessary that each observation form the subject of a fusion.

As stated previously, the method according to the invention consists initially in constructing over time, observation after observation, the global fictitious mesh and in modifying the organization of this mesh so as to integrate the effects of the fusions of observations. This fictitious mesh can of course be constructed in various ways. In the same way, its behavior in the case of observation fusion may be described by various series of rules. A way of implementing the method according to the invention is described hereinafter in the text, by way of application.

It is recalled here that the method according to the invention consists mainly in formulating a fictitious elastic mesh on the basis of the various real observations carried out, in determining evolution rules followed by this fictitious mesh when it is subjected to certain stresses which originate from real events impinging on the observations carried out, the opportunity to fuse two observations notably, and then in altering the geometry of the mesh when such events occur and in retranscribing at the level of the real observations the modification of the geometry of the mesh, knowing that this modification is manifested by a modification of the positions of the nodes of the mesh which represent the observations performed, the modification of the position of a node being manifested in reality by a corresponding modification of the estimated position of the observation (or of the contact) associated with this node.

Since the fictitious mesh described previously consists of nodes connected together by elastic links, it is possible to define a potential energy. For each of the elastic links constituting the mesh this energy $E_i$ is given by the following relation:

$$E_i = \frac{K_i}{2} \cdot (\eta_i - \varepsilon_i)^2 \quad [2]$$

in which $K_i$ is the stiffness of the spring formed by this link and in which $\eta_i$ and $\varepsilon_i$ respectively represent the initial length and the final length of the link.

Hence, the potential energy of the global mesh, moreover equal to the sum of the potential energies of the set of elastic links constituting this mesh, may be expressed by the following relation:

$$E = \tfrac{1}{2} \cdot Q^T \cdot M \cdot Q + \tfrac{1}{2} \cdot (PI+Q)^T \cdot C \cdot (PI+Q) \quad [3]$$

Here PI represents the "initial position" vector whose dimension evolves in the course of time. Its components represent the list of positions of the nodes corresponding to the observations carried out and the list of positions of the associated contacts. Knowing that the initial position of a contact is not defined, the values are arbitrarily chosen to be zero. Hence it is possible to write:

$$PI = \begin{bmatrix} P_i \\ \ldots \\ 0 \\ \ldots \end{bmatrix} \begin{matrix} \}\text{Observations} \\ \\ \}\text{Contacts} \\ \end{matrix}$$

The vector PI thus takes the form of a string of N components, N being a number which varies in the course of time, whose first $N_{obs}$ components relate to the nodes associated with observations carried out (the number of which is here $N_{obs}$), and whose last $N-N_{obs}$ components relate to the nodes associated with contacts.

Q represents for its part the "nodal displacement" vector whose dimension and structure evolve like those of PI. Each of its components represents the displacement affecting the position of the node considered.

The matrix M is a square matrix whose dimension is equal to the sum of the number of observations and of the number of contacts. It describes the global mesh constructed gradually in a temporal manner, without the stresses.

From a practical point of view, the matrix M is constructed as follows:

Firstly, the matrix M is initialized as a matrix containing only zeros.

Secondly, for each observation $O_i$ (each node), the value of the element M(i, i) corresponding to the anchorage of the observation is determined. Hence it is possible to write:

$M(i,i)=M(i,i)+K_A(i)$ where $K_A(i)$ represents the stiffness of the link inking the node to the ground, given by the relation:

$$K_A(i) = \frac{1}{\sigma_i^2},$$

where $\sigma_i$ represents the position uncertainty for the observation $O_i$.

Thirdly, for each pair of observations ($O_i$, $O_j$) whose associated nodes are tied together, the stiffness $K_L(i, j)$ of the link between the nodes i and j corresponding to the two observations is calculated. $K_L(i, j)$ is defined by the relation:

$$K_L(i, j) = \frac{1}{\sigma_{ij}^2}$$

where $\sigma_{ij}$ represents the relative uncertainty in position defined by:

$\sigma_{ij} = \sqrt{\sigma_i^2 + \sigma_j^2}$.

$\sigma_i$ and $\sigma_j$ corresponding respectively to the uncertainties in the measurements of the positions of the nodes associated with the observations i and j.

Thereafter the elements of the matrix M are calculated with the aid of the following expressions:

$M(i,i)=M(i,i)+K_L(i,j)$ $M(j,j)=M(j,j)+K_L(i,j)$ and $M(i,j)=M(i,j)-K_L(i,j)$ $M(j,i)=M(j,i)-K_L(i,j)$ The matrix M is thus constructed gradually: its size increases as new observations are carried out.

The matrix C is also a square matrix of the same dimension as the matrix M. It describes the constraints of the mesh, that is to say the relations between the observations and the contacts, knowing that the constraints are produced by the fusions of observations and that a fusion is manifested by the attachment of the nodes associated with the fused observations to a node associated with a common contact.

From a practical point of view, the matrix C is constructed as follows:

Firstly, all the elements of the matrix C are initialized to zero.

Secondly, for each pair formed by an observation $O_i$ and the contact $T_k$, ($O_i$, $T_k$) with which it is associated, the stiffness $K_C(i, k)$ of the link between the corresponding nodes is calculated. $K_C(i, k)$ is defined by the relation:

$$K_C(i, k) = \frac{1}{\sigma_i^2}$$

where $\sigma_i$ representing the position uncertainty for the observation $O_i$.

Thereafter the elements of the matrix C are calculated with the aid of the following expressions:

$C(i,i)=C(i,i)+K_C(i,k)$ $C(i,k+Nb_{obs})=C(i,k+Nb_{obs})-K_C(i,k)$ $C(k+Nb_{obs},i)=C(k+Nb_{obs},i)-K_C(i,k)$ $C(k+Nb_{obs},k+Nb_{obs})=C(k+Nb_{obs},k+Nb_{obs})+K_C(i,k)$ Like the matrix M, the matrix C is constructed gradually its size increasing as new observations are carried out.

The vector PI as well as the matrices M and C having been defined, the expression of relation [3] giving the energy E of the global mesh appears as a function of the "displacement" vector Q. Consequently, if it is sought to minimize the value of E it is appropriate to determine the optimal values of the components of Q, that is to say in particular the optimal value of the displacement undergone by each of the nodes, which allow this minimization. It may be shown in this regard that the optimal vector Q is given by the following expression:

$Q_{opt} = -[M+C]^{-1} \cdot C \cdot PI$

Hence the fictitious mesh is assigned a new position vector, the vector PC of the corrected estimated positions, which defines the new positions of the nodes and hence the new estimated positions of the observations and of contacts associated with these nodes. The vector PC of the corrected estimated positions is defined by the relation:

$PC=PI+Q_{opt}$

The final step of the method according to the invention therefore consists in assigning to each observation a corrected position corresponding to that component of the vector PC which relates to the corresponding node.

It should be noted that like the vector PI, the vector PC contains the corrected positions $TE_C(k)$ of the contacts. Now, insofar as by definition a contact has no initial position, the value of this corrected position corresponds to the corresponding value Q(k) of the vector Q.

It should be noted that in the same way as the method according to the invention makes it possible, as has been set forth, to benefit, for the set of observations performed, from the possibility of fusing certain tracks so as to improve the precision of the estimation of the positions of the set of observations, this method may be exploited to benefit from the fact that certain observations performed may relate to objects whose positions are known precisely. For this purpose the method according to the invention can comprise a, complementary, phase third phase, similar to the second phase described previously, implemented when such an observation is signaled. In such a circumstance, the position of the node of the fictitious mesh, associated with the contact corresponding to this observation, may be modified, so that the appearance is observed of a tension between this node and the node associated with the corresponding observation which tension is resolved as in the case of a fusion of observations by a global modification of the positions of the set of nodes of the mesh. This modification is manifested in the real world by a modification of the estimated positions of the set of observations and contacts.

It should moreover be noted that, in parallel with its main object, the method according to the invention may be used to allow the vehicle to correct the error made by the onboard measurement means in the determination of the real position of the vehicle at a given instant, an error in the estimated position of the vehicle giving rise to a systematic error in the estimation of the positions of the observations performed. For this purpose the method according to the invention can comprise a complementary phase, implemented after the second or the third phase, during which the estimation of the position of the vehicle is updated on the basis of the modified estimated positions of the observations.

The invention claimed is:

1. A computer-implemented method for estimation and dynamic correction of absolute positions of stationary objects observed in a zone, the method comprising:
  insonificating the zone from different angles using a sonar detection system displaced above the zone;
  receiving data acquired by the sonar detection system;
  detecting acoustic shadows representing detected stationary objects projected on the zone based on the data acquired by the sonar detection system, each acoustic shadow being an observation;
  estimating the absolute positions of said observations in at least two dimensions;
  creating a fictitious object for each observation, each fictitious object being a contact;
  initializing an estimated position of each fictitious object based on the estimated absolute position of a corresponding observation;
  a first phase comprising:
    constructing a fictitious mesh based on the observations detected over time by representing each observation by a node having an initial position equal to the estimated absolute position of the observation, and by connecting the nodes together by fictitious elastic links;
  associating, when a new observation is detected, the new observation with a new node having an initial position equal to an estimated absolute position of the new observation, the new node being connected to a fictitious anchoring point in the zone by a first fictitious elastic link;
  integrating the new node into the fictitious mesh by new fictitious elastic links, each of the new fictitious elastic links connecting the new node to nodes of the fictitious mesh corresponding to observations preceding the new observation in time; and
  tying the new node associated with the new observation by another fictitious elastic link to a contact node associated with a contact corresponding to the new observation, an initial position of the contact node being the estimated absolute position of the new observation, such that the elastic links have initial lengths that do not exert tension on the nodes to which the elastic links are connected;
  a second phase comprising:
  fusing, when two observations of said detected observations relate to the same stationary object in the zone, the two observations by associating the two observations with a single contact, a position of the single contact being dependent on the estimated absolute positions of said two fused observations, the fusing of the two observations being at the level of the fictitious mesh by replacing contact nodes associated with the contacts initially corresponding to the two observations by a common contact node associated with a common contact, the common contact node being tied to the nodes associated with the two observations by way of the fictitious links initially connecting nodes associated with the two observations to the contact nodes associated with the contacts corresponding to the two observations;
  inducing tensions, based on the replacement with the common contact node into the fictitious mesh, on the nodes associated with the two fused observations, the tensions being transmitted to other nodes of the fictitious mesh by the fictitious elastic links;
  resolving the tensions by a modification of the positions of the nodes constituting the fictitious mesh; and
  replacing the estimated absolute position of the observation or the initial position of the contact associated with each node with the associated modified position of each node of the fictitious mesh,
  wherein the first phase is implemented throughout the duration of the zone analysis, and the second phase is implemented at each time a fusion of two observations is decided.

2. The computer-implemented method according to claim 1, wherein, when the observation corresponds to an object having a known real position, the second phase comprises modifying the position of the common contact node associated with the observation such that the common contact node occupies the position of the object.

3. The computer-implemented method according to claim 1, further comprising a complementary phase, following the second phase, comprising re-estimating the absolute positions of the observations based on the modified positions of the observations.

4. The computer-implemented method according to claim 1, wherein a fictitious elastic link tying a node i corresponding to a new observation to a corresponding ground inking point has a zero initial length, a stiffness $k_A$ of the fictitious elastic link being defined by the relation:

$$K_A(i) = \frac{1}{\sigma_i^2}$$

$\sigma_i$ corresponding to an uncertainty in measurement of the absolute position of the observation i.

5. The computer-implemented method according to claim 1, wherein a fictitious elastic link tying a node i corresponding to a new observation to the node of the fictitious mesh corresponding to an earlier observation j has a length determined by positions of nodes at the moment of establishment of the fictitious elastic link such that the node corresponding to the new observation is positioned vertically in line with a corresponding anchoring point and that the fictitious elastic link does not exert any stress on the nodes, a stiffness $k_L$ of the fictitious elastic link being defined by the relations:

$$K_L(i,j) = \frac{1}{\sigma_{ij}^2} \text{ and } \sigma_{ij} = \sqrt{\sigma_i^2 + \sigma_j^2}$$

$\sigma_i$ and $\sigma_j$ corresponding, respectively, to uncertainties in measurements of the absolute positions of the observations i and j.

6. The computer-implemented method according to claim 1, wherein a fictitious elastic link tying a node i corresponding to a new observation to the node corresponding to a corresponding contact has a zero initial length, a stiffness $k_C$ of the fictitious elastic link being defined by the relation:

$$K_C(i,k) = \frac{1}{\sigma_i^2}$$

$\sigma_i$ corresponding to an uncertainty in measurement of the absolute position of the observation i.

7. The computer-implemented method according to claim 1, wherein,
 the tensions induced by fusion of the two observations are manifested by a modification of the positions of the nodes constituting the fictitious mesh,
 a vector PI of the initial positions of the nodes is defined,
 a size of the vector PI varies over time as new observations are detected and components of the vector PI form a list of N components,
 first $N_{obs}$ components relate to nodes associated with observations and last $N-N_{obs}$ components relate to nodes associated with contacts,
 each component corresponds to the position of a node upon introduction of the component into the fictitious mesh, and
 a size of a vector PC of the modified positions of the nodes of the fictitious mesh varies over time as new observations are detected and as fusions take place,
 the vector PC is defined based on the vector PI by the following relation:

$$PC = PI + Q_{opt}$$

in which $Q_{opt}$ represents a vector of optimal nodal displacements, each of the components of $Q_{opt}$ corresponds to a correction term to be applied to a corresponding component of the vector of the initial positions PI to determine a corresponding component of the vector PC of the modified positions, each component of the vector $Q_{opt}$ being dependent on the configuration of a fictitious mesh at the instant considered and characteristics of the fictitious elastic links connecting the nodes of the fictitious mesh together.

8. The computer-implemented method according to claim 7, wherein:
 the vector of the optimal nodal displacements $Q_{opt}$ is defined by the following relation:

$$Q_{opt} = -[M+C]^{-1} \cdot C \cdot PI,$$

in which M and C represent two square matrices having dimensions equal to the number of nodes of the fictitious mesh at the instant considered, the matrices M and C being previously initialized to zero;
 the matrix M is established in two phases:
  a first phase during which values of elements (i, i) situated on a diagonal of the matrix M, an element of the diagonal characterizing the link of each node associated with an observation i to its corresponding anchoring point, are calculated based on the following relation:

$$M(i,i) = M(I,I) + k_A(i) \text{ with } K_A(i) = 1/\sigma_i^2$$

a second phase during which values of the elements (i, j) of the matrix M, characterizing a link existing between the nodes of an observation i and of an observation j, are calculated based on the following relations:

$$M(i,i) = M(i,i) + k_L(i,j),$$

$$M(j,j) = M(j,j) + k_L(i,j)$$

and $$M(i,j) = M(i,j) - k_L(i,j)$$

$$M(j,i) = M(j,i) - k_L(i,j)$$

with $K_L(i,j) = 1/\sigma_{ij}^2$ and $\sigma_{ij} = \sqrt{\sigma_i^2 + \sigma_j^2}$, and
 the matrix C is established in two phases:
  a first phase during which values of element (i, k) of the matrix C, characterizing a link existing between the node associated with an observation i and that associated with a contact k, are calculated based on the following relations:

$$C(i,i) = C(i,i) + k_C(i,k)$$

$$C(N_{obs}+k, N_{obs}+k) = C(N_{obs}+k, N_{obs}+k) + k_C(i,k)$$

$$C(i, N_{obs}+k) = C(i, N_{obs}+k) - k_C(i,k)$$

$$C(N_{obs}+k, i) = C(N_{obs}+k, i) - k_C(i,k)$$

with $k_C(i,k) = 1/\sigma_i^2$
where $N_{obs}$ represents the number of observations.

9. A computer-implemented method of non-real-time mapping of a zone based on absolute positions of objects observed by a sonar detection system observing the zone, the method comprising:
 implementing the method according to claim 1 on stored observations, and
 recalculating the positions of the observations being used to fill in the fictitious map of the zone.

\* \* \* \* \*